(12) United States Patent
Case et al.

(10) Patent No.: US 9,436,248 B2
(45) Date of Patent: Sep. 6, 2016

(54) DATA PROCESSING SYSTEM WITH PROTOCOL DETERMINATION CIRCUITRY

(71) Applicants: Lawrence L. Case, Austin, TX (US); Matthew W. Brocker, Gilbert, AZ (US); Mingle Sun, Shanghai (CN); Thomas E. Tkacik, Phoenix, AZ (US)

(72) Inventors: Lawrence L. Case, Austin, TX (US); Matthew W. Brocker, Gilbert, AZ (US); Mingle Sun, Shanghai (CN); Thomas E. Tkacik, Phoenix, AZ (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 466 days.

(21) Appl. No.: 13/956,118

(22) Filed: Jul. 31, 2013

(65) Prior Publication Data

US 2015/0039916 A1 Feb. 5, 2015

(51) Int. Cl.
*G06F 1/32* (2006.01)
*G06F 1/00* (2006.01)
*G06F 1/26* (2006.01)

(52) U.S. Cl.
CPC ................ *G06F 1/263* (2013.01); *G06F 1/32* (2013.01)

(58) Field of Classification Search
CPC .................................. G06F 1/32; G06F 1/26
See application file for complete search history.

(56) References Cited

U.S. PATENT DOCUMENTS

| | | | | |
|---|---|---|---|---|
| 5,867,718 A * | 2/1999 | Intrater | ................. | G06F 1/3215 713/323 |
| 6,285,659 B1 | 9/2001 | Feuerstraeter et al. | | |
| 7,496,671 B2 | 2/2009 | Engel et al. | | |
| 7,913,008 B2 | 3/2011 | Chen et al. | | |
| 8,237,414 B1 * | 8/2012 | Li | ......................... | H02J 7/0003 320/103 |
| 2004/0017772 A1 * | 1/2004 | Saito | ..................... | G06F 13/385 370/229 |
| 2007/0136497 A1 * | 6/2007 | Trivedi | ..................... | G06F 1/26 710/62 |
| 2007/0276548 A1 * | 11/2007 | Uzunovic | ............... | G06F 1/266 700/297 |
| 2009/0249089 A1 * | 10/2009 | Tremel | .................. | G06F 1/3203 713/300 |
| 2012/0042180 A1 * | 2/2012 | Ewing | ....................... | G06F 1/26 713/300 |
| 2013/0124591 A1 * | 5/2013 | Buch | ....................... | G06F 7/588 708/251 |
| 2013/0290748 A1 * | 10/2013 | Zhu | ........................... | G06F 1/26 713/300 |
| 2014/0054385 A1 * | 2/2014 | Stewart | ............. | G06K 19/0709 235/492 |
| 2014/0358377 A1 * | 12/2014 | Hammerschmidt | .... | G06F 11/36 701/45 |
| 2015/0015195 A1 * | 1/2015 | Leabman | ............... | H02J 7/0042 320/108 |

FOREIGN PATENT DOCUMENTS

| | | |
|---|---|---|
| CN | 102255496 A | 11/2011 |
| WO | 20102255496 A1 | 11/1998 |

* cited by examiner

*Primary Examiner* — Phil Nguyen

(57) ABSTRACT

A semiconductor device includes a processing system including a section of power domain circuitry and a section of coin cell power domain circuitry. The coin cell power domain circuitry is configured to, when power is initially provided to the coin cell power domain circuitry, using power provided by a power management circuit as feedback to determine that the power management circuit provides the power in response to a power request signal being a toggle signal, and determine that the power management circuit provides the power in response to the power request signal being a pulse signal.

20 Claims, 11 Drawing Sheets

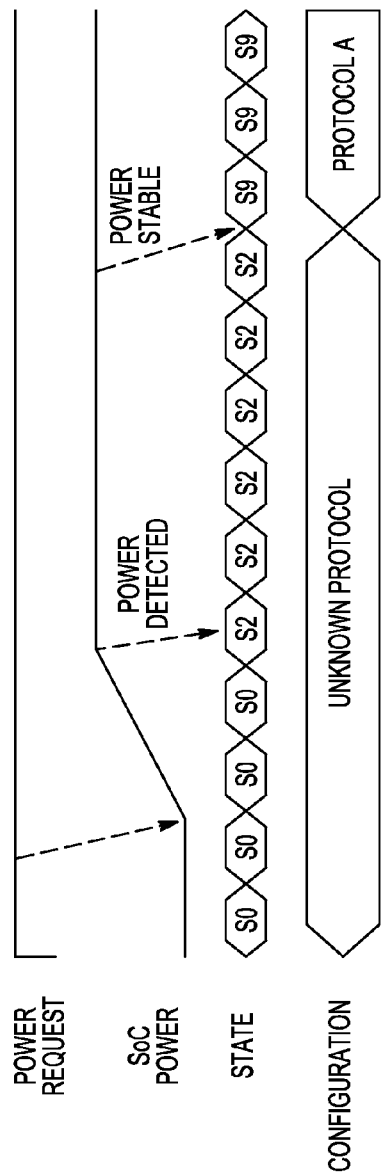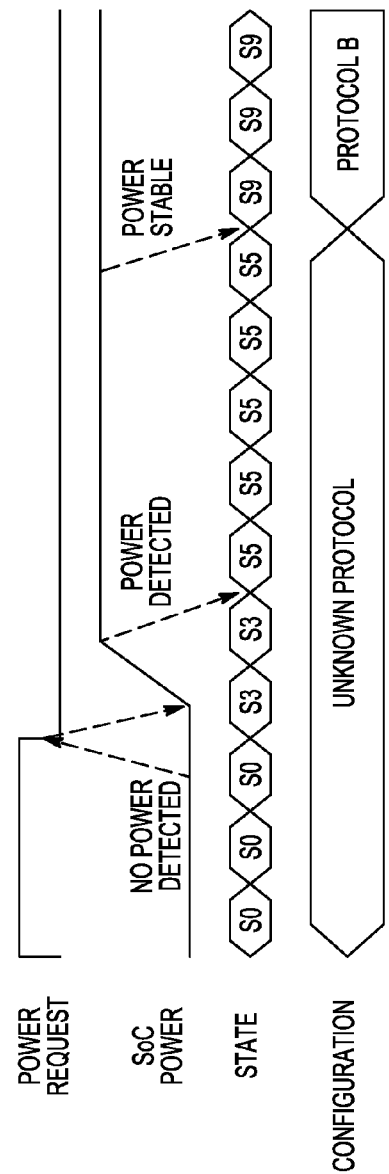

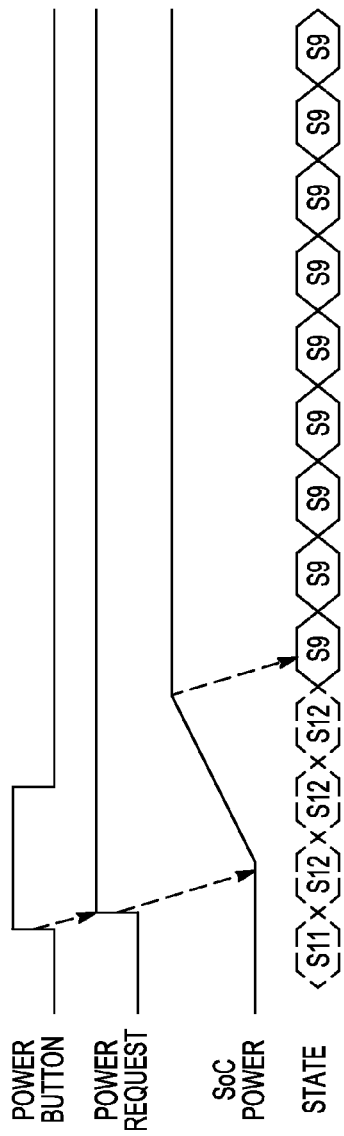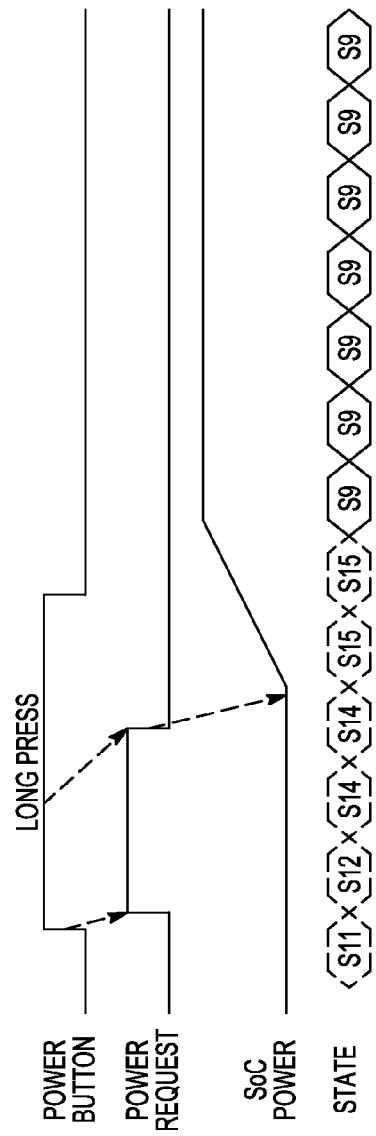

DATA PROCESSING SYSTEM WITH PROTOCOL DETERMINATION CIRCUITRY

BACKGROUND

1. Field

This disclosure relates generally to data processing systems, and more specifically, to data processing systems with protocol determination circuitry.

2. Related Art

The power provided to an integrated circuit, such as to a system on a chip (SoC), is, in many cases, provided by a power management integrated circuit (PMIC). The integrated circuit provides a power request signal to request that the PMIC either power on or power off the IC. Different types of PMICs are designed to respond to different protocols which define different types of signaling mechanisms. For example, one PMIC may interface with a toggle-type switch. In order for this type of PMIC to properly interface with the IC, the power request signal must be a toggle-mode signal. Another type of PMIC may interface with a pulse-type switch. In order for this type of PMIC to properly interface with the IC, the power request signal must be a pulse-mode signal. Therefore, it is necessary for an IC to know the type of PMIC in order to appropriately interface with the PMIC. However, at the time of design, it is unknown what type of PMIC might be used to interface with the IC. While pins are typically used to provide configuration information to ICs, pin counts are typically tightly controlled. Therefore, adding an additional pin to an IC in order to provide the PMIC type can be cost prohibitive. Therefore, a need exists for an improved interface to PMICs which can handle different types of PMICs and does not require additional pins.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 5 illustrates, in timing diagram form, a method for detecting a first protocol in accordance with a first example.

FIG. 6 illustrates, in timing diagram form, a method for detecting a second protocol in accordance with a first embodiment.

FIG. 9 illustrates, in timing diagram form, a method for detecting the first protocol in accordance with a second example.

FIG. 10 illustrates, in timing diagram form, a method for detecting the second protocol in accordance with a second example.

DETAILED DESCRIPTION

In one embodiment, an IC includes circuitry which is powered by a PMIC and circuitry which is powered by a low power source, such as a coin cell battery. The circuitry powered by the PMIC is located within an SoC power domain. The SoC may include any number and type of circuits which receive power provided by the PMIC. The circuitry powered by the low power source is located within a lower power domain, which may be referred to as a coin cell power domain. Upon initially applying power to the coin cell power domain, the circuitry within this domain determines the protocol of the PMIC. During this configuration phase, circuitry within the coin cell power domain provides test signals by way of an output pin to the PMIC and monitors the power provided by the PMIC to the IC in response to these test signals in order to determine the protocol of the PMIC. Determining the protocol of the PMIC includes determining whether the PMIC provides power in response to a toggle-mode signal or to a pulse-mode signal. After the configuration phase, such as during normal operation, the IC can request powering on and off of the IC by sending a power request signal by way of the output pin to the PMIC in accordance with the appropriate protocol expected by the PMIC.

Figure 1:
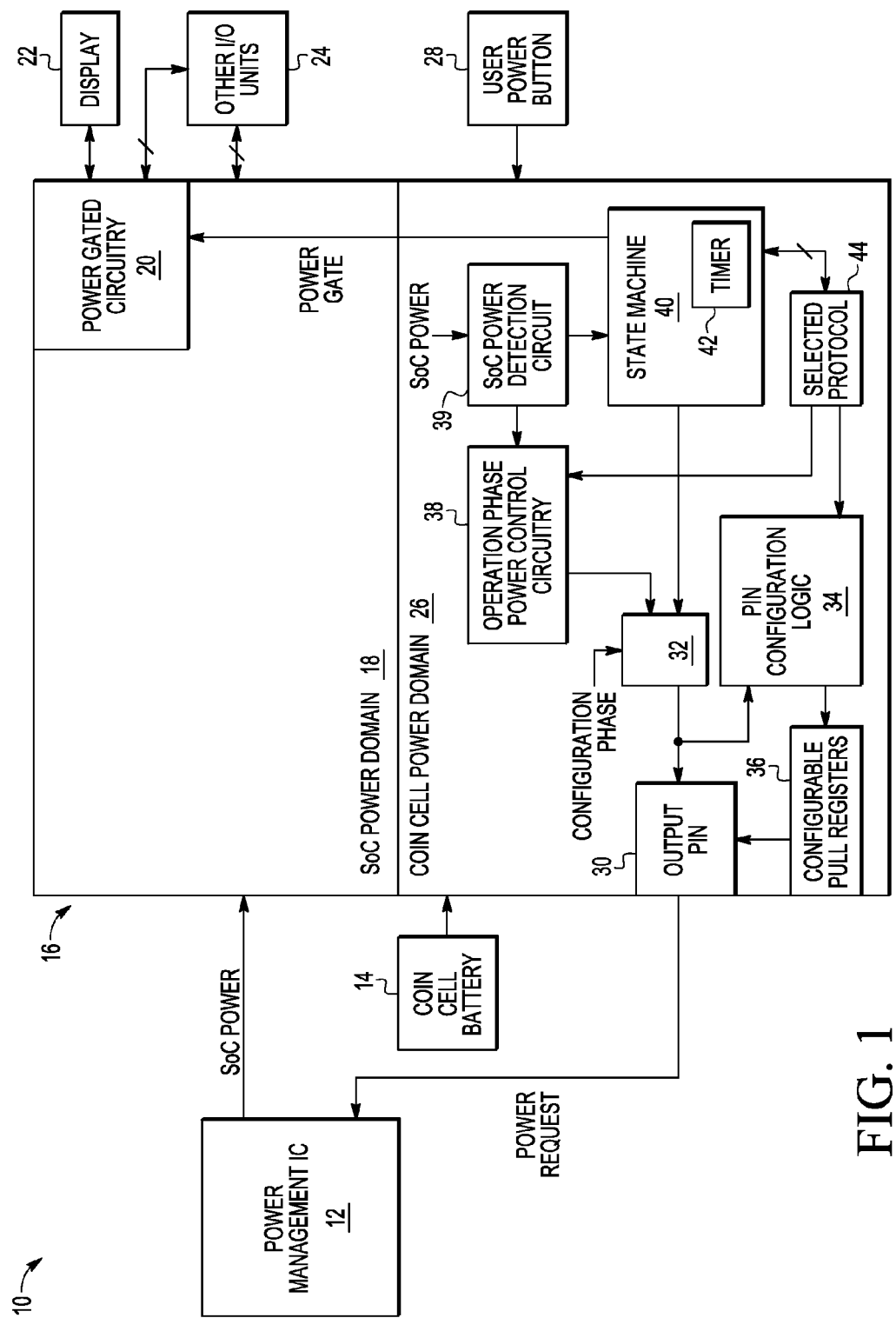
FIG. 1 illustrates, in block diagram form, a system 10 in accordance with one embodiment.

FIG. 1 illustrates, in block diagram form, a system 10 in accordance with one embodiment. System 10 includes an integrated circuit 16, which may be referred to as an SoC, and a PMIC 12 coupled to IC 16. IC 16 includes an SoC power domain 18 which is powered by PMIC 12 and a coin cell power domain 26 which is powered by a coin cell battery 14. That is, IC 16 includes a section of SoC power domain circuitry in SoC power domain 18 and a section of coin cell power domain circuitry in coin cell power domain 26. The SoC power domain circuitry in SoC power domain 18 includes any type of circuitry to provide any type of functions, in which this circuitry is powered by SoC power. The SoC power domain circuitry in SoC power domain 18 may also include power gated circuitry 20 in which the SoC power provided to this circuitry can be gated in response to a power gate signal. In this manner, when the power gate signal is asserted, power is removed from or gated from devices within power gated circuitry 20. Note that the actual level of the SoC power provided by PMIC 12 is determined by PMIC 12 and can be any voltage and/or current level, as needed by IC 16. System 10 may include a display 22 coupled to IC 16, and other I/O units 24 coupled to IC 16. Display 22 and any portion of other I/O units 24 may be coupled to power gated circuitry 20 such that power provided to these elements may also be gated in response to the power gate signal. Another portion of other I/O units 24 may be coupled to SoC power domain 18 in which power to this portion is not gated in response to the power gate signal.

Coin cell power domain 26 includes coin cell domain circuitry which is powered by coin cell battery 14, and thus remains powered by coin cell battery 14 so long as coin cell battery 14 is present. The coin cell power domain circuitry in coin cell power domain 26 includes an output pin 30 (also referred to as an output pad) which interfaces to system 10 external to IC 16. In the illustrated embodiment, output pin 30 provides a power request signal to PMIC 12. The coin cell power domain circuitry in coin cell power domain 26 also includes operation phase power control circuitry 38, an SoC power detection circuit 39, a state machine 40, a selected protocol 44, a selector 32, pin configuration logic 34, and configurable pull resistors 36. Configurable pull resistors 36 can be configured to operate as pull up resistors or pull down resistors coupled to output pin 30. Therefore, depending on the primary resting state of output pin 30, e.g. whether it primarily outputs a logic level high or logic level low, configurable pull resistors 36 can be coupled as pull up or pull down resistors, respectively. This configuration can be determined by pin configuration logic 34 which is coupled to the output of selector 32 and to selected protocol 44. SoC power detection circuit 39 receives SoC power from PMIC 12 and detects when this voltage has reached a threshold level, indicating that PMIC 12 is supplying power to IC 16. SoC power detection circuit 39 provides an indicator that SoC power has been detected to state machine 40 and operation phase power control circuitry 38. Note that SoC power detection circuit 39 may be considered a portion of state machine 40 since it provides an input used by state machine 40.

State machine 40 and selected protocol 44 are stored within storage circuitry within coin cell battery power domain 26. State machine 40 includes a timer 42 (or may instead, receive a clock signal from elsewhere within coin cell power domain 26) and control circuitry which controls the state transitions of state machine 40 in accordance with timer 42. State machine 40 also includes an output coupled to selector 32 to provide test signals used in determining the protocol of PMIC 12. Once the protocol is determined by state machine 40, this determined protocol is stored as selected protocol 44. As an example, selected protocol 44 may indicate that PMIC 12 expects the power request signal output by output pin 30 to be an active high toggle-mode signal, an active low toggle-mode signal, an active-high pulse-mode signal, or an active-low pulse-mode signal. In one embodiment, selected protocol 44 may also indicate if an error occurred in which a protocol could not be determined.

Therefore, during a configuration phase, state machine 40 provides test signals, by way of selector 32, to output pin 30 which provides these test signals as the power request signal to PMIC 12. In response thereto, PMIC 12 provides SoC power to IC 16. SoC power detection circuit 39 detects whether or not the voltage of SoC has reached a threshold level, and, in response thereto, provides an indication to state machine 40 as to whether SoC power has been detected or not. State machine 40, based on the received SoC power, transitions states accordingly (as will be described in more detail below). Therefore, state machine 40 may provide test signals and observe the resulting SoC power, as needed, until a protocol of PMIC 12 is determined. Once the protocol is determined and stored as selected protocol 44, operation phase power control circuitry 38 can access selected protocol 44 in order to provide the power request signal, by way of selector 32, to output pin 30. In this manner, output pin 30 can provide the power request signal generated by operation phase power control circuitry 38 to PMIC 12 in the format expected by the protocol of PMIC 12. Note that once the protocol of PMIC 12 has been determined and normal operation has begun, another state machine (not shown) may be used to perform the proper signaling, by way of the power request signal, to PMIC 12 for power on and off requests.

Therefore, as can be seen in FIG. 1, operation phase power control circuitry 38 receives an indication as to whether SoC power has been detected from SoC power detection circuitry 39, and provides a power request signal to a first input of selector 32. State machine 40 also receives an indication as to whether SoC power has been detected from SoC power detection circuitry 39 and provides test signals to a second input of selector 32. When state machine 40 is operating in the configuration phase (in which it is sending out test signals in order to determine the protocol of PMIC 12), state machine 40 may assert a configuration phase signal (provided to a control input of selector 32) so that selector 32 provides the test signals from state machine 40 to output pin 30 to be provided as the power request signal to PMIC 12. When state machine 40 is no longer in the configuration phase and IC 16 is in a normal operation phase (after selected protocol 44 has been determined), state machine 40 may negate the configuration phase signal so that selector 32 provides a power request signal from operation phase power control circuitry 38 to output pin 30 to be provided as the power request signal to PMIC 12. Operation phase power control circuitry 38 may control the powering on and off of SoC power domain 18, as needed, by providing a power request signal, in accordance with an appropriate protocol, to PMIC 12. Furthermore, during the configuration phase of state machine 40, state machine 40 may also assert the power gate signal so that any circuitry in power gated circuitry 20 is not receiving the SoC power during the configuration. This may protect the circuitry within power gated circuitry 20 since the SoC power may be varying undesirably during configuration.

System 10 also includes a user power button 28 coupled to coin cell power domain 26. As will be described below, the information from user power button 28 allows for user-assisted protocol determination. Also, the information provided by user power button 28 may be provided to operation phase power control circuitry 38 and to state machine 40.

In the illustrated embodiment of FIG. 1, coin cell power domain 26 is powered by coin cell battery 14. A coin cell battery typically has a long lifetime, thus reducing the need for frequent replacement. As will be described below, upon inserting coin cell battery 14, state machine 40 is immediately placed into configuration mode to determine selected protocol 44. Therefore, note that this configuration only needs to be performed each time a coin cell battery is inserted. Prior to determination of selected protocol 44, PMIC 12 is not available to provide the SoC power to IC 16. In alternate embodiments, power domain 26 may be other types of power domains powered by other types of power sources which provide power when PMIC 12 is not yet available to provide power to IC 16. In this manner, power domain 26 has sufficient power available to determine the protocol of PMIC 12 so that the power request signal can properly interface to PMIC 12 and PMIC 12 can properly provide SoC power to IC 16. That is, once selected protocol 44 is determined, PMIC 12 is available to provide the SoC power to IC 16. In one embodiment, power domain 26 is a lower power domain than SoC power domain 18, in that it receives a lower voltage/current level. In other alternate embodiments, other power domains in addition to SoC power domain 18 may also be powered by PMIC 12. In these embodiments, during normal operation, operation phase power control circuitry 38 may provide additional information to PMIC 12 along with the power request signal to indicate which one or more particular power domains of IC 16 correspond to the power request signal.

Figure 2:
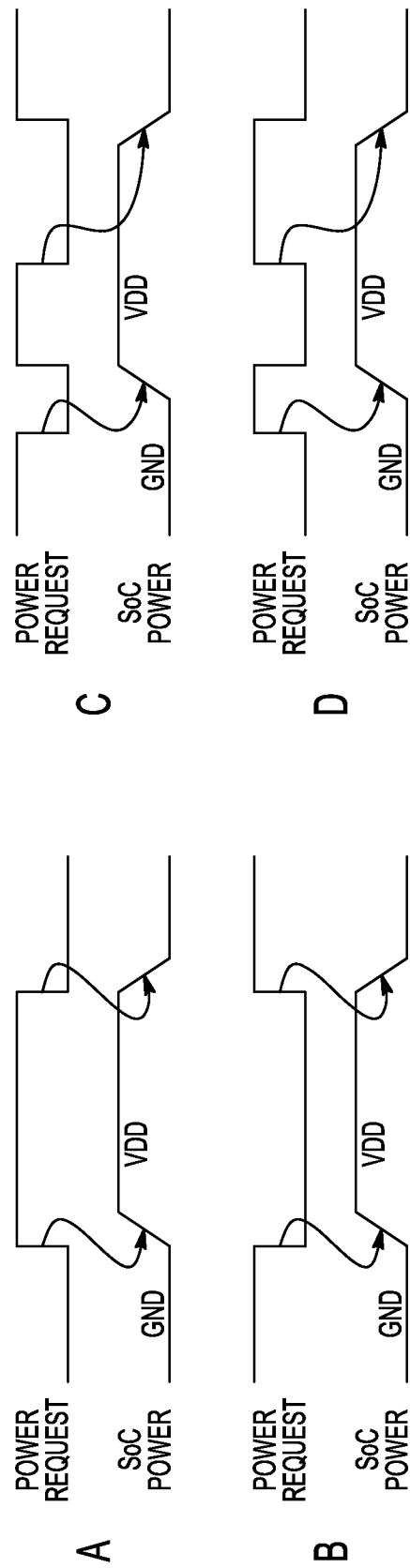
FIG. 2 illustrates, in diagram form, various types of signaling protocols in accordance with one embodiment.

FIG. 2 provides examples of four different protocols which may be expected by a PMIC, such as PMIC 12. Protocol A refers to an active-high toggle-mode signal. Protocol B refers to an active-low toggle-mode signal. Protocol C refers to an active-low pulse-mode signal. Protocol D refers to an active-high pulse-mode signal. In one embodiment, a PMIC may use a pulse-mode power request signal, and require that the trailing edge of the pulse occur within a specific time period. If the trailing edge of the pulse does not occur within the time period, the PMIC will power down. Therefore, in this embodiment, pulse-mode does not just refer to a transition which goes high or low, but to a pulse having both a leading and trailing edge (in which the leading edge can be a rising or falling edge and the trailing edge can be a falling or rising edge, respectively).

If PMIC 12 operates according to protocol A, then when the power request signal received by PMIC 12 transitions from a logic level low to a logic level high, the SoC power transitions from a first voltage potential (e.g. ground) to a second voltage potential (e.g. VDD), in which the second voltage potential is higher than the first voltage potential. Therefore, the first voltage potential may be referred to as "low" and the second voltage potential may be referred to as "high". The first voltage potential may refer to ground, and the second voltage potential may refer to the normal operating voltage, VDD, for IC 16 when powered on. When the power request signal transitions from a logic level high back to a logic level low, then the SoC power transitions back from the second voltage potential to the first voltage potential. Therefore, while the power request signal remains at a logic level high, the SoC power remains at the second voltage potential. For protocol A, a single cycle of the active-high toggle-mode power request signal, which results in the SoC power turning on, transitions from logic level low to logic level high.

If PMIC 12 operates according to protocol B, then when the power request signal received by PMIC 12 transitions from a logic level high to a logic level low, the SoC power transitions from the first voltage potential to the second voltage potential. When the power request signal transitions from a logic level low back to a logic level high, then the SoC power transitions from the second voltage potential to the first voltage potential. Therefore, while the power request signal remains at a logic level low, the SoC power remains at the second voltage potential. For protocol B, a single cycle of the active-low toggle-mode power request signal, which results in the SoC power turning on, transitions from logic level high to logic level low.

If PMIC 12 operates according to protocol C, then when the power request signal received by PMIC 12 has a first falling edge (thus transitioning from a logic level high to a logic level low), the SoC power transitions from its current voltage potential (which is the first voltage potential in the illustrated embodiment) to the other voltage potential (which is the second voltage potential in the illustrated embodiment). When the power request signal has a second (e.g. subsequent) falling edge (thus again transitioning from a logic level high to a logic level low), the SoC power again transitions from its current voltage potential (which is now the second voltage potential in the illustrated embodiment) to the other voltage potential (which is the first voltage potential in the illustrated embodiment). Therefore, each subsequent falling edge of the power request signal results in a transition of the SoC power from its current voltage potential to the other voltage potential. In this manner, the SoC power transitions between the first and second voltage potentials. Furthermore, each falling edge of the power request signal defines the beginning of an active low pulse. At the end of the active low pulse, the power request signal returns to a logic level high until another falling edge is required to again transition the SoC power. In one embodiment, if the active low pulse is too long, an error condition occurs in which PMIC 12 powers off IC 16 (e.g. by placing the SoC power to ground). For protocol C, a single cycle of the active-low pulse-mode power request signal, which results in the SoC power turning on, transitions from logic level high to logic level low, and then back to a logic level high.

If PMIC 12 operates according to protocol D, then when the power request signal received by PMIC 12 has a first rising edge (thus transitioning from a logic level low to a logic level high), the SoC power transitions from its current voltage potential (which is the first voltage potential in the illustrated embodiment) to the other voltage potential (which is the second voltage potential in the illustrated embodiment). When the power request signal has a second (e.g. subsequent) rising edge, the SoC power again transitions from its current voltage potential (which is now the second voltage potential in the illustrated embodiment) to the other voltage potential (the first voltage potential in the illustrated embodiment). Therefore, each subsequent rising edge of the power request signal results in a transition of the SoC power from its current voltage potential to the other voltage potential. Furthermore, each rising edge of the power request signal defines the beginning of an active high pulse. At the end of the active high pulse, the power request signal returns to a logic level low until another rising edge is require to again transition the SoC power. In one embodiment, if the active high pulse is too long, an error condition occurs in which PMIC 12 powers off IC 16 (e.g. by placing the SoC power to ground). For protocol D, a single cycle of the active-high pulse-mode power request signal, which results in the SoC power turning on, transitions from logic level low to logic level high, and then back to a logic level low.

Figure 3:
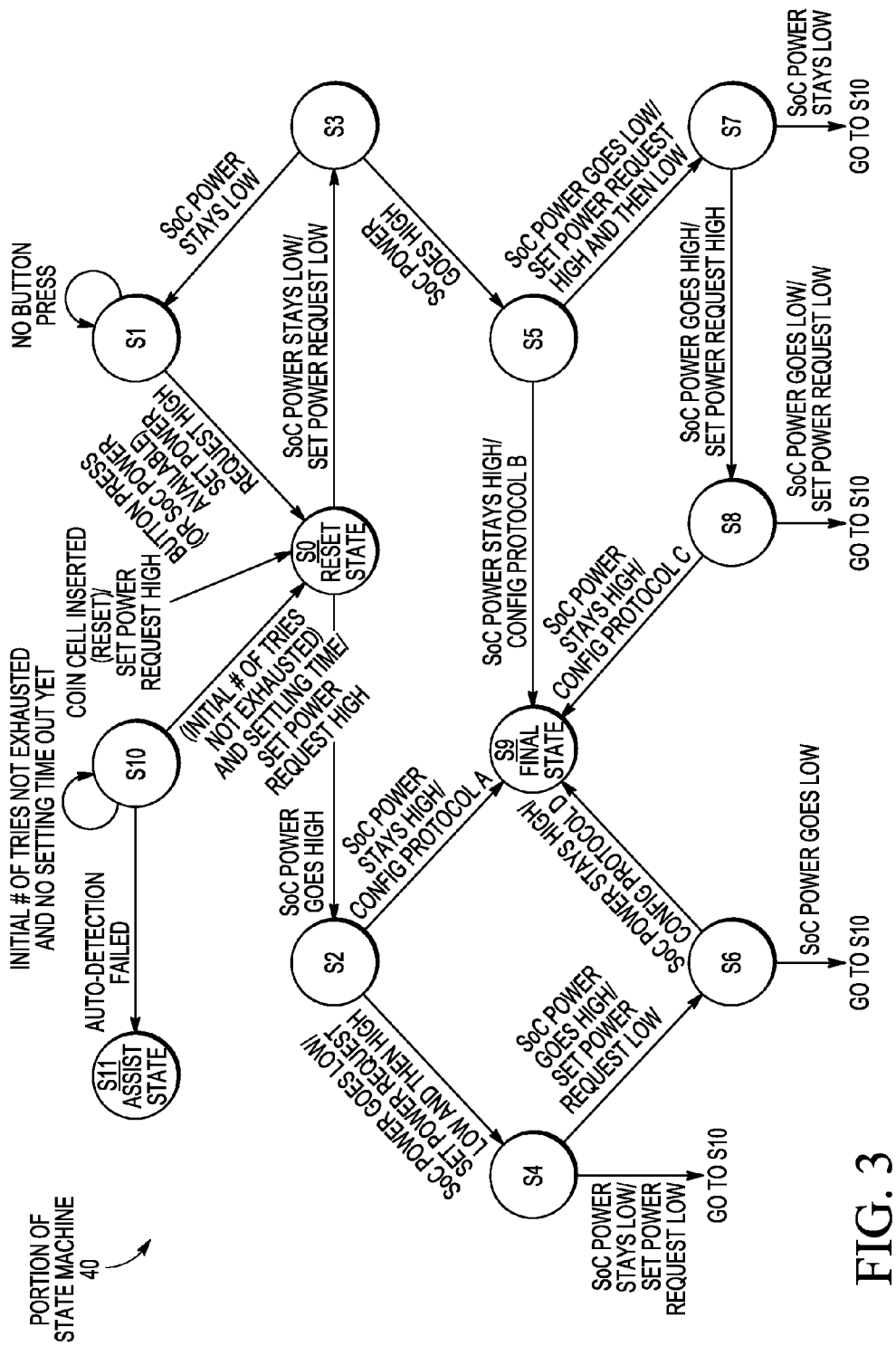
FIGS. 3 and 4 illustrate, in diagrammatic form, a state machine which detects a protocol configuration of a PMIC in accordance with an embodiment.
Figure 4:
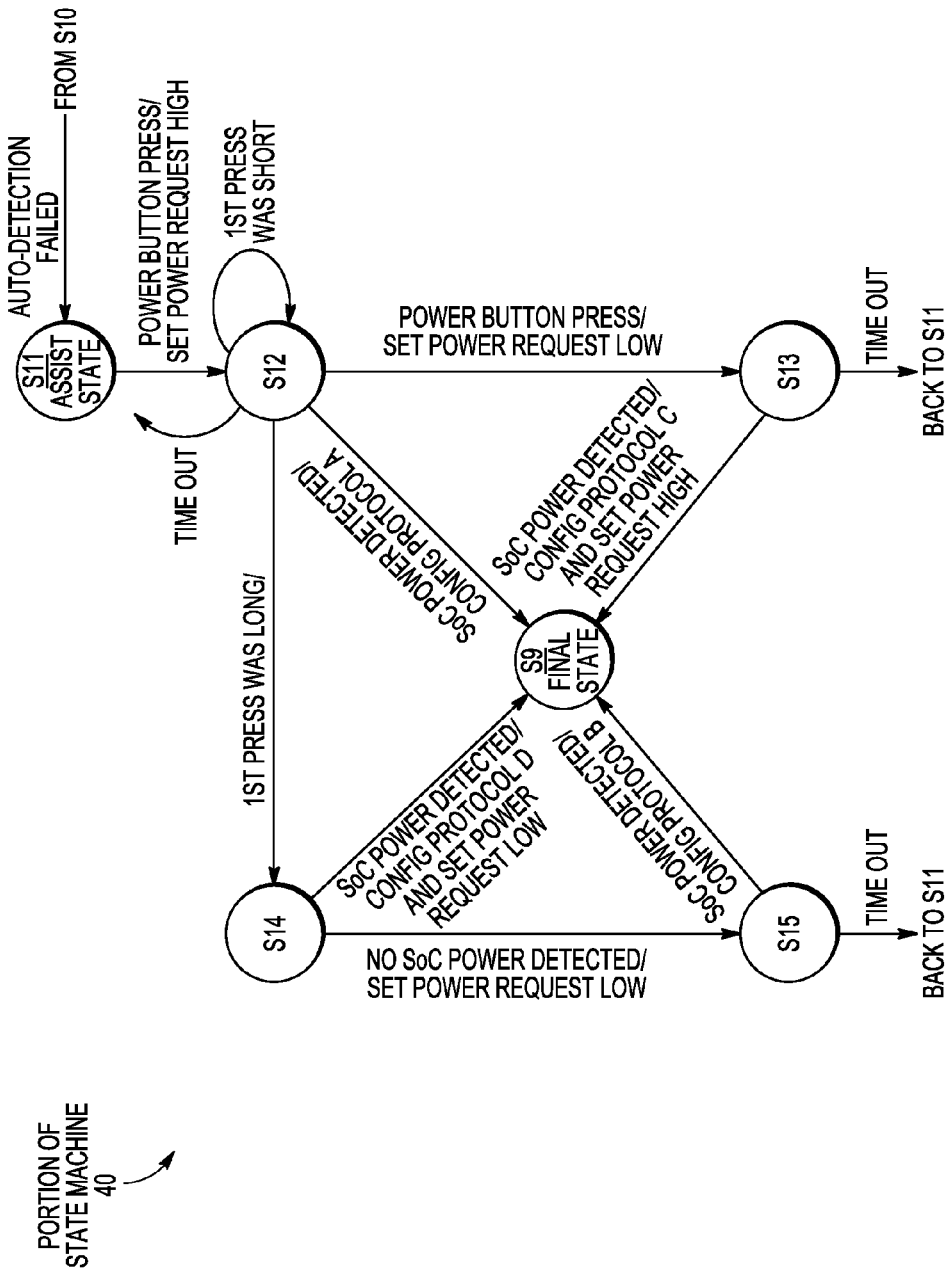

FIGS. 3 and 4 illustrate state machine 40 in further detail in accordance with one embodiment. FIGS. 5-12 correspond to various examples of how state machine 40 transitions in order to determine a particular protocol. During the transitions of state machine 40, state machine 40 provides the power request signal to PMIC 12 by way of selector 32 and pin 30. This power request signal that is provided during the transitions of state machine 40 during the configuration phase may be referred to as a test signal. Each of FIGS. 5-12 includes an illustration of the power request signal which is sent out as a test signal to PMIC 12 by way of selector 32 and output pin 30, the SoC power which is provided by PMIC 12, the state of state machine 40, and the configuration of PMIC 12. Note that FIGS. 9-12 also include a power button signal which is provided by user power button 28. FIGS. 5-12 will be described in combination with state machine 40 of FIGS. 3 and 4.

State machine 40 begins in state 0 (S0) when a coin cell battery is inserted (thus creating a power-on RESET of coin cell domain 26 and initiating the configuration phase). Therefore, S0 may also be referred to as the reset state. Also, upon entering S0, the power request signal is set to a logic level high. Referring back to FIG. 1, state machine sets the power request signal to a logic level high by way of selector 32 and output pin 30, as was described above, in which the configuration phase signal is asserted, thus selecting the second input of selector 32. In state S0, it is determined whether the SoC power goes high or low. As used in this example, SoC power going high may refer to the SoC power going to the second voltage potential described above in reference to FIG. 2, and the SoC power going low may refer to the SoC power going to the first voltage potential described above in reference to FIG. 2. Therefore, in response to setting the power request signal to a logic level high upon entering S0, PMIC 12 may respond by controlling the SoC power. Based on how PMIC 12 controls the SoC power, state machine 40 will transition through its states to determine which protocol is used by PMIC 12. If, in S0, it is determined that the SoC power went high, state machine 40 transitions to state 2 (S2). S2 may be referred to as an active high protocol state which indicates that the protocol of PMIC 12 is likely to be an active high protocol since the SoC power was detected after the power request signal went high. In S2, it is determined whether the SoC power subsequently goes low or if the SoC power stays high for a predetermined amount of time (which may refer to a predetermined number of clock cycles of timer 42). If the SoC power did stay high for the predetermined amount of time, state machine 40 determines the configuration of PMIC 12 is protocol A, and state machine 40 transitions to state 9 (S9). Since, upon entering S9 from another state, the protocol of PMIC 12 is determined, S9 may be referred to as the final state.

Referring to the example of FIG. 5, initially state machine 40 is in state S0 and therefore the power request signal is set to a logic level high. This is therefore provided as a test signal to PMIC 12. In response, PMIC 12 turns on the SoC power such that a ramp-up of SoC power begins, thus transitioning state machine 40 to S2. The SoC power stays high for a number of clock cycles (such as of timer 42) at which point the power is determined to be stable at the high level. Therefore, at this point, state machine 40 transitions to S9, and the configuration is determined to be protocol A since PMIC 12 responded appropriately to the power request signal being an active high toggle-mode signal.

Referring back to FIG. 3, if in S2 the SoC power goes low, state machine 40 transitions to state 4 (S4) and the power request signal is set first to low then to high, so as to provide a rising edge of the power request signal. S4 may be referred to as the active high pulse-mode state which detects that the SoC power signal went low after some time indicating that the protocol is likely a pulse-mode type signal. In S4, it is determined whether the SoC power stays low for a predetermined amount of time (which may refer to a predetermined number of clock cycles of timer 42) or if the SoC power goes high. If the SoC power stays low, state machine 40 transitions to state 10 (S10) and the power request signal is set to a logic level low. Note that S10 may be referred to as an error state and indicates occurrence of an error in which the protocol cannot be determined. S10 will be described in further detail below. If, in S4, the SoC power goes high, state machine 40 transitions to state 6 (S6) and the power request signal is set to a logic level low to provide the trailing edge of the active high pulse. S6 may be referred to as the final confirmation state for an active-high pulse-mode protocol. In S6, if the SoC power goes low, then an error may be indicated, and state machine 40 transitions to S10. However, in S6, if the SoC power stays high for a predetermined amount of time (which may refer to a predetermined number of clock cycles of timer 42), then state machine 40 transitions to S9, and the configuration of PMIC 12 is determined to be protocol D.

Figure 8:
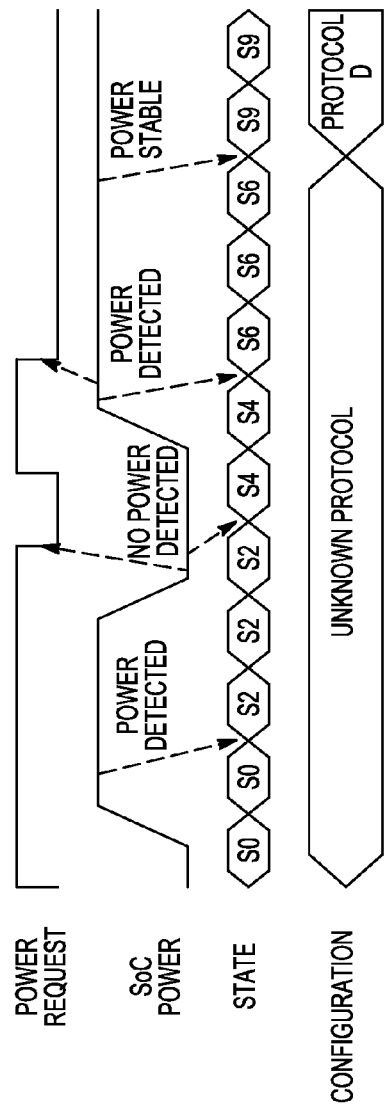
FIG. 8 illustrates, in timing diagram form, a method for detecting a fourth protocol in accordance with a first embodiment.

Referring to the example of FIG. 8, initially state machine 40 is in state S0 and therefore the power request signal is set to a logic level high. This is therefore provided as a test signal to PMIC 12. In response, PMIC 12 turns on the SoC power such that a ramp-up of SoC power begins, thus transitioning state machine 40 to S2. In one embodiment, the power request signal is not set to a logic level low (to provide a trailing edge to the pulse) within a specified period of time, and PMIC 12 detects the error condition and turns the SoC power off again. Because the power request signal stays high, the SoC power returns low (indicating no power is detected from PMIC 12), therefore, state machine 40 transitions to S4. With the transition to S4, the power request signal is set to low then back to high to provide a rising edge. In response to the rising edge, PMIC 12 turns on the SoC power such that a ramp-up of SoC power begins, therefore power is detected and state machine 40 transitions to S6. The power request signal is set to a logic level low, thus providing the trailing edge to the active high pulse-mode signal. The SoC power remains high for a predetermined number of clock cycles at which point the power is determined to be stable at the high level. Therefore, at this point, state machine 40 transitions to S9, and the configuration is determined to be protocol D since PMIC 12 responded appropriately to the power request signal being an active high pulse-mode signal.

Referring back to FIG. 3, in S0, if it is determined that the SoC power (in response to being set high upon entering S0) stays low for a predetermined amount of time (which may refer to a predetermined number of clock cycles of timer 42), then state machine 40 transitions to state 3 (S3) and the power request signal is set to a logic level low. S3 may be referred to as the no power detected state which indicates that the protocol is likely to be an active low protocol since the SoC power was not detected after the power request signal went high. In S3, if the SoC power goes high, then state machine transitions to S5. S5 may be referred to as the active low protocol state which detects that the PMIC 12 responded to the lowering of the power request signal. The SoC power has been detected, but it is not yet known if the protocol is a toggle-type or pulse-type protocol. In S5, if the SoC power stays high for a predetermined amount of time (which may refer to a predetermined number of clock cycles of timer 42), state machine 40 determines the configuration of PMIC 12 is protocol B, and state machine 40 transitions to S9.

Referring to the example of FIG. 6, initially state machine 40 is in state S0 and therefore the power request signal is set to a logic level high. This is therefore provided as a test signal to PMIC 12. In response, the SoC power stays low (in which no power is detected), thus transitioning state machine 40 to S3. Upon transition to S3, the power request signal is set to a logic level low, and in response, PMIC 12 turns on the SoC power such that a ramp-up of SoC power begins. Therefore, power is detected and state machine 40 transitions to S5. The SoC power stays high for a number of clock cycles (such as of timer 42) at which point the power is determined to be stable at the high level. Therefore, at this point, state machine 40 transitions to S9, and the configuration is determined to be protocol B since PMIC 12 responded appropriately to the power request signal being an active low toggle-mode signal.

Referring back to FIG. 3, in S5, if it is determined that the SoC power signal goes low, state machine 40 transitions to state 7 (S7), and the power request signal is set first to high then to low, so as to provide a falling edge of the power request signal. S7 may be referred to as the active low pulse mode state which determines that the SoC power signal went low after some time meaning that the protocol is probably a pulse-mode. In S7, it is determined whether the SoC power stays low for a predetermined amount of time (which may refer to a predetermined number of clock cycles of timer 42) or if the SoC power goes high. If the SoC power stays low, then an error may be indicated and state machine 40 transitions to S10. If, in S7, the SoC power goes high, state machine 40 transitions to state 8 (S8) and the power request signal is set to a logic level high, to provide the trailing edge to the active low power request signal. S8 may be referred to as the final confirmation state for an active-high pulse-mode protocol. In S8, if the SoC power goes low, then an error may be indicated, and state machine 40 transitions to S10. However, in S8, if the SoC power stays high for a predetermined amount of time (which may refer to a predetermined number of clock cycles of timer 42), then state machine 40 transitions to S9, and the configuration of PMIC 12 is determined to be protocol C.

Figure 7:
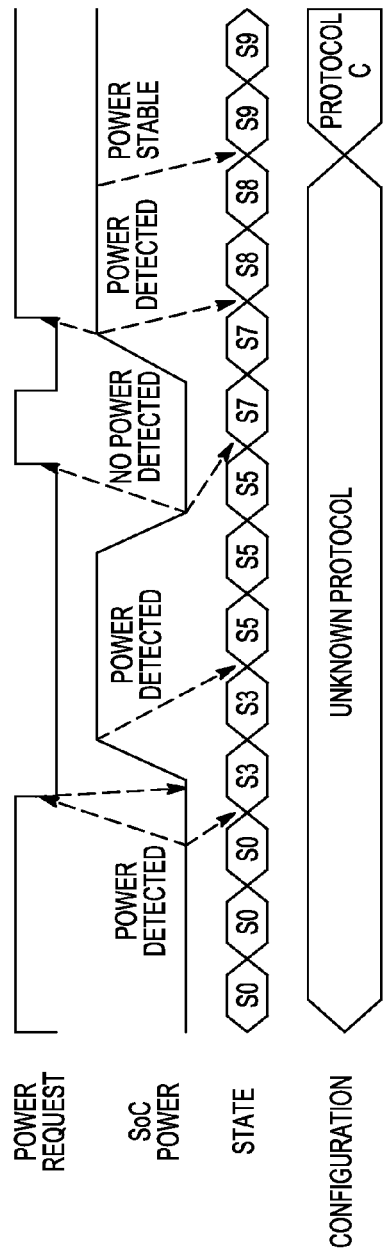
FIG. 7 illustrates, in timing diagram form, a method for detecting a third protocol in accordance with a first embodiment.

Referring to the example of FIG. 7, initially state machine 40 is in state S0 and therefore the power request signal is set to a logic level high. This is therefore provided as a test signal to PMIC 12. In response, the SoC power stays low such that no power is detected, thus transitioning state machine 40 to S3. With the transition to S3, the power request signal is set to low, thus providing a falling edge for the power request signal. In response to the falling edge, PMIC 12 turns on the SoC power such that a ramp-up of SoC power begins, therefore power is detected and state machine 40 transitions to S5. However, a subsequent rising edge to the power request pulse-mode signal is not provided to PMIC 12 and therefore PMIC 12 turns off the SoC power. Therefore, upon no power being detected, state machine 40 transitions to S7. Upon transitioning to S7, the power request signal is set to high (the inactive state) then low in order to provide a falling leading edge to an active-low pulse. In response to the falling edge, PMIC 12 turns on the SoC power such that a ramp-up of SoC power begins. Power is again detected and state machine 40 transitions to S8, where the power request signal is set to a logic level high to provide the trailing edge of the active-low pulse. In S8, the SoC power remains high for a predetermined number of clock cycles at which point the power is determined to be stable at the high level. Therefore, at this point, state machine 40 transitions to S9, and the configuration is determined to be protocol C since PMIC 12 responded appropriately to the power request signal being an active low pulse-mode signal.

Referring back to FIG. 3, if, in S3, it is determined that the SoC power stays low (after the power request signal was set to low upon the transition to S3), state machine 40 transitions to state 1 (S1). In S1, it is unknown whether PMIC 12 is responding at all to the power request signal. For example, it is possible that PMIC 12 itself is not powered, or that there is some other error. Therefore, S1 may be referred to a s a No SoC power available state since it is possible that when the coin cell battery is inserted, no SoC power is available. In this case, regardless of the protocol of PMIC 12, SoC power will not ramp up, and state machine 40 waits for a button press of user power button 28 to indicate that system 10 is functional and another attempt at determining the configuration should be made. Therefore, upon detecting a button press of user power button 28, state machine 40 transitions back to S0 and the power request signal is again set to a logic level high. In an alternate embodiment, in S1, rather than awaiting a button press of user power button 28, another external indicator may be used, such as a power-availability signal which may come from PMIC 12.

Note that when in S0, a transition from S0 to S2 is assuming that an active high toggle-type or active high pulse-type signal is expected by PMIC 12. Therefore, the active high scenarios are attempted with the test signals provided by state machine 40 to PMIC 12. A transition from S0 to S3, though, is assuming that an active low toggle-type or active-low pulse-type signal is expected by PMIC 12. Therefore, the active low scenarios are attempted with the test signals provided by state machine 40 to PMIC 12. As described above, there are situations in which state machine 40 cannot detect a protocol and thus transitions to the error state, S10. In S10, if the initial number or tries has not been exhausted (i.e. has not reached a predetermined threshold), and an appropriate settling time has passed to allow PMIC 12 to settle, state machine 40 sets the power request signal to high and transitions back to S0 to give state machine 40 another attempt to determine the protocol. However, if the number of tries has been exhausted, then auto-detection the protocol configuration of PMIC 12 has failed, and state machine 40 transitions to state 11 (S11).

S11 may be referred to as a user-assist state which transitions state machine 40 from detecting a protocol configuration without user input to a user-assisted mode in which user inputs, by way of user power button 28, is used to select the configuration of PMIC 12. Note that in this situation, the user typically knows the protocol of PMIC 12 and can provide a known input sequence, by way of user power button 28, to state machine 40 in order to appropriately set selected protocol 44.

Referring to FIG. 4, state machine 40 has entered S11 from S10 when auto-detection of the protocol configuration of PMIC 12. From S11, state machine 40 transitions to state 12 (S12) when a first power button press is detected of user power button 28. Note that this first button press, based on how the user performed the button press, can either be a long button press or a short button press. This can be determined by timer circuitry (such as timer 42 or other timer circuitry) in coin cell power domain 26 which is coupled to user power button 28. A long button press may be a button press whose duration lasts longer than a threshold time value, and a short button press may be a button press whose duration lasts less than the threshold time value. Upon transitioning to S12, the power request signal is set to a logic level high. In S12, if there is a time out, state machine 40 transitions back to S11. While no additional power button press is detected, state machine 40 remains in S12 if the first power button press is determined to be a short button press and transitions to state 14 (S14) if the first power button press is determined to be a long button press. Also, in S12, if the first power button press is determined to be a short button press and the SoC power is detected, state machine 40 transitions to final state S9 in which the configuration of PMIC 12 is selected as protocol A.

Referring to the example of FIG. 9, initially state machine 40 is in S11 and the power request signal is a logic level low. Upon occurrence of a power button press (in which the power button signal goes from a logic level low to a logic level high), the power request signal is set to a logic level high, and state machine 40 transitions to S12. In response, PMIC 12 turns on the SoC power such that a ramp-up of SoC power begins. Therefore, state machine 40 transitions to S9 since power is detected, and the selected configuration is set to protocol A.

Referring back to FIG. 4, in S12, if a second power button press is detected, state machine 40 transitions to state 13 (S13) and the power request signal is set to low. In S13, if SoC power is detected, state machine 40 transitions to final state S9 and the configuration of PMIC 12 is selected as protocol C. Upon transitioning to S9, the power request signal is also set to a logic level high. In S13, though, if a time-out occurs in which no SoC power is detected within a predetermined time-out window, state machine 40 transitions back to S11.

Figure 11:
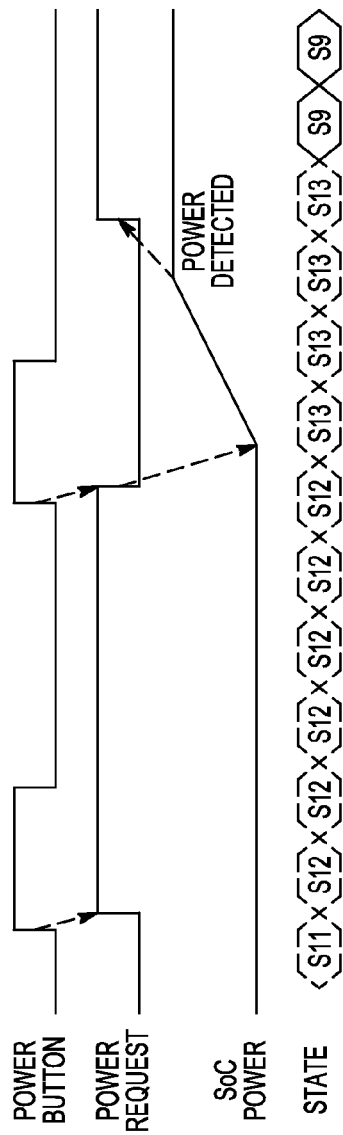
FIG. 11 illustrates, in timing diagram form, a method for detecting the third protocol in accordance with a second example.

Referring to the example of FIG. 11, initially, state machine 40 is in S11 and the power request signal is a logic level low. Upon occurrence of a first power button press, the power request signal is set to a logic level high and state machine 40 transitions to S12. The button press is determined to be a short button press, therefore state machine remains in S12 until a second button press is detected. At this point, state machine 40 transitions to S13 and the power request signal is set to low. In response, PMIC 12 turns on the SoC power such that SoC begins ramping-up. Once the SoC power reaches a predetermined level, the SoC power is detected. At this point, state machine 40 transitions to S9, and the selected configuration is set to protocol C.

Referring back to FIG. 4, in S12, if it is determined the button press is long, state machine 40 transitions to S14. In S14, if SoC power is detected, state machine 40 transitions to S9, and the selected configuration is set to protocol D. Also, upon transitioning to S9, the power request signal is set to a logic level low.

Figure 12:
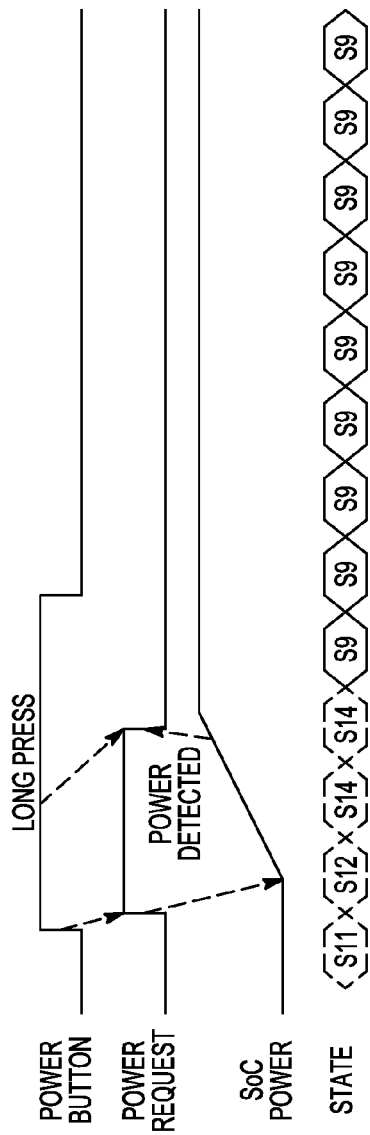
FIG. 12 illustrates, in timing diagram form, a method for detecting the fourth protocol in accordance with a second example.

Referring to the example of FIG. 12, initially state machine 40 is in S11 and the power request signal is a logic level low. Upon occurrence of a power button press (in which the power button signal goes from a logic level low to a logic level high), the power request signal is set to a logic level high, and state machine 40 transitions to S12. In S12, the button press is determined to be a long button press, therefore, state machine 40 transitions S14. In response, to the rising edge of the power request signal, PMIC 12 turns on the SoC power such that a ramp-up of SoC power begins. Once the SoC power achieves a predetermined level, the SoC power is detected. At this point, state machine 40 transitions to S9, and the selected configuration is set to protocol D.

Referring back to FIG. 4, in S14, if no SoC power is detected, state machine 40 transitions to state 15 (S15) and the power request signal is set to a logic level low. In S15, if, after setting the power request signal low, SoC power is detected, state machine 40 transitions to S9 and the selected configuration is set to protocol B. In S15, though, if a time-out occurs in which no SoC power is detected within a predetermined time-out window, state machine 40 transitions back to S11.

Referring to the example of FIG. 10, initially state machine 40 is in S11 and the power request signal is a logic level low. Upon occurrence of a first power button press, the power request signal is set to a logic level high and state machine 40 transitions to S12. The button press is determined to be a long button press, therefore state machine transitions to S14. In S14, no SoC power is detected, therefore state machine 40 transitions to S15 and the power request signals is set to logic level low. In response, PMIC 12 turns on the SoC power such that SoC begins ramping-up. Once the SoC power reaches a predetermined level, the SoC power is detected. At this point, state machine 40 transitions to S9, and the selected configuration is set to protocol B.

As discussed above, for PMICs which use protocols C or D, the PMIC may power off the SoC power if the active-low pulse or the active-high pulse is held for too long. In one embodiment, the PMIC may include a timer which causes power to be turned off when the pulse is timed out by this PMIC timer. However, with the circuitry of coin cell power domain 26, the feedback provided by the SoC power can also be used to finalize the pulse for protocol C or D. In this manner, it can be ensured that the pulse of protocol C or D ends after the SoC powers up but before the PMIC timer times out. This feedback obviates the need to know a priori how long the time-out value and debounce window of the PMIC timer is. Therefore, PMICs of varying watchdog timeout values and debounce windows can be handled in system 10. For example, upon knowing the configuration protocol, circuitry in coin cell power domain 26 can provide a first edge (rising or falling, based on whether protocol C or D is determined as the protocol), and can monitor the output of voltage detection circuit 39 to see when IC 26 is powered up. This information can then be used to set the pulse width which is long enough for the PMIC to power up IC 16, but less than the PMIC timer. In another embodiment, state machine 40, while detecting the configuration protocol of PMIC 12, can use information as to when PMIC 12 turns on SoC power in response to a rising or falling edge to determine an appropriate pulse width of the pulse request signal if protocol C or D is determined.

Figure 13:
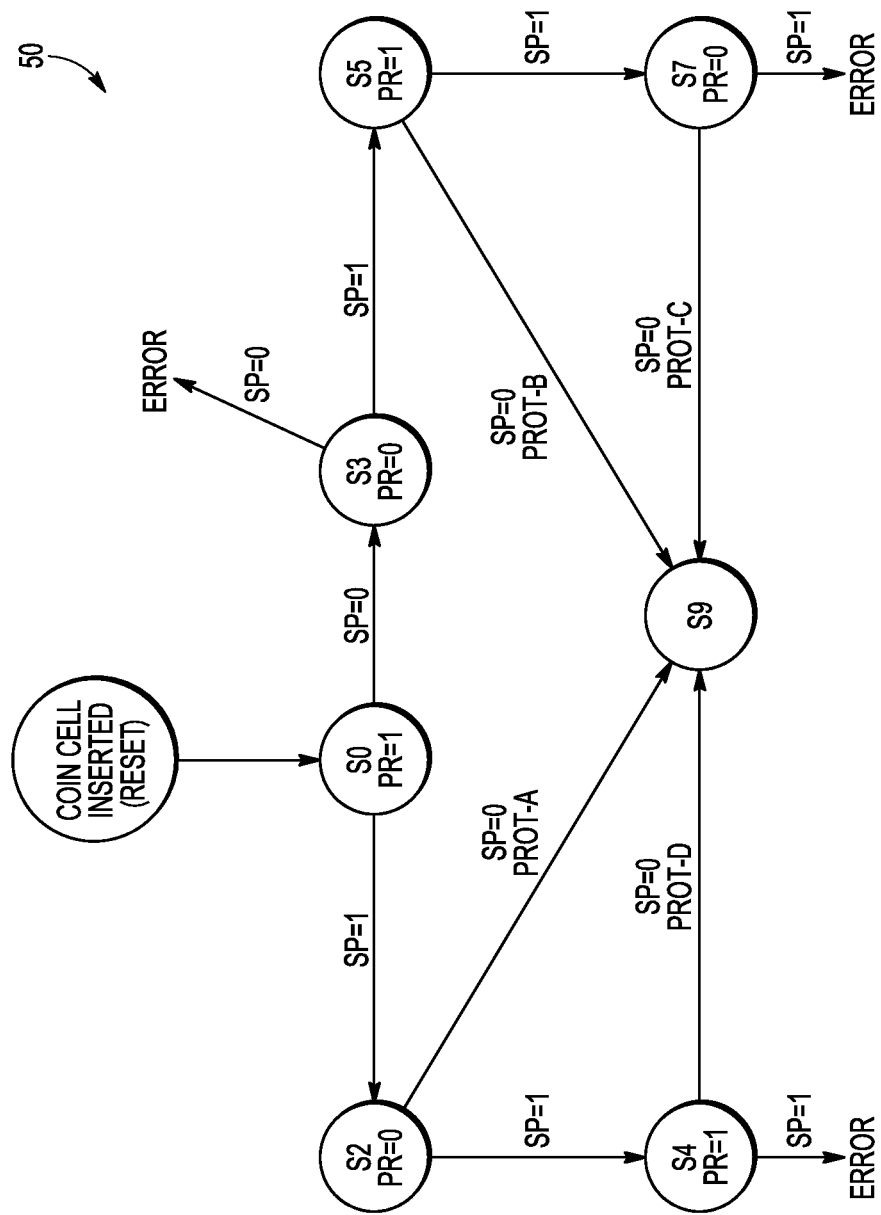
FIG. 13 illustrates, in diagrammatic form, a state machine which detects a protocol configuration of a PMIC in accordance with an embodiment.

FIG. 13 illustrates a state machine 50, which may be used in coin cell power domain 26 in place of state machine 40, in accordance with one embodiment. That is, state machine 50 can be used in a manner similar to state machine 40 to determine the protocol of PMIC 12. Therefore, during a configuration phase, state machine 50 may provide test signals, by way of selector 32, to output pin 30 which provides these test signals as the power request signal to PMIC 12. In response thereto, PMIC 12 provides SoC power to IC 16. SoC power detection circuit 39 detects whether or not the voltage of SoC has reached a threshold level, and, in response thereto, provides an indication to state machine 50 as to whether SoC has been detected or not. State machine 50, based on the received SoC power, transitions states accordingly (as will be described in more detail below). Therefore, as with state machine 40, state machine 50 may provide test signals and observe the resulting SoC power, as needed, until a protocol of PMIC 12 is determined. Once the protocol is determined and stored as selected protocol 44, operation phase power control circuitry 38 can access selected protocol 44 in order to provide the power request signal, by way of selector 32, to output pin 30. In this manner, output pin 30 can provide the power request signal generated by operation phase power control circuitry 38 to PMIC 12 in the format expected by the protocol of PMIC 12.

Also, as with state machine 40, when state machine 50 is operating in the configuration phase (in which it is sending out test signals in order to determine the protocol of PMIC 12), state machine 50 may assert the configuration phase signal, as was described above. When state machine 50 is no longer in the configuration phase and IC 16 is in a normal operation phase (after selected protocol 44 has been determined), state machine 50 may negate the configuration phase signal. Furthermore, during the configuration phase of state machine 50, state machine 50 may also assert the power gate signal, as was described above. State machine 50 may be used in an embodiment where a pulse-mode PMIC may not power off if the trailing edge of the power request signal does not arrive within a specified time period. In such an embodiment, the PMIC may only look for the leading edge of the power request signal.

FIGS. 14-17 correspond to various examples of how state machine 50 transitions in order to determine a particular protocol. In the illustrated embodiment of FIG. 13, at each state of state machine 50, state machine 50 provides the power request signal to PMIC 12 by way of selector 32 and pin 30. This power request signal that is provided at each state machine 50 may be referred to as a test signal. Note that in an alternate embodiment, the power request signal corresponding to a particular state may be provided at the transition into the state (and thus be provided as part of the transition into the state rather than upon entering the state, as was described with respect to state machine 40 of FIGS. 3 and 4). Also, note that state machine 50, as illustrated, includes states S0, S2, S3, S4, S5, S7, and S9. Each of FIGS. 14-17 includes an illustration of the power request signal which is sent out as a test signal to PMIC 12 by way of selector 32 and output pin 30, the SoC power which is provided by PMIC 12, the state of state machine 50, and the configuration of PMIC 12. FIGS. 14-17 will be described in combination with state machine 50 of FIG. 13.

State machine 50 begins in state 0 (S0) when a coin cell battery is inserted (thus creating a power-on RESET of coin cell domain 26 and initiating the configuration phase). Therefore, S0 may also be referred to as the reset state. Also, upon entering S0, the power request signal (illustrated as "PR") is set to a logic level high. Referring back to FIG. 1, state machine 50 may set the power request signal to a logic level high by way of selector 32 and output pin 30, as was described above, in which the configuration phase signal is asserted, thus selecting the second input of selector 32. In state S0, it is determined whether the SoC power (illustrated as "SP") goes high or low. As used in this example, SoC power going high may refer to the SoC power going to the second voltage potential described above in reference to FIG. 2, and the SoC power going low may refer to the SoC power going to the first voltage potential described above in reference to FIG. 2. Therefore, in response to setting the power request signal to a logic level high upon entering S0, PMIC 12 may respond by controlling the SoC power. Based on how PMIC 12 controls the SoC power, state machine 50 will transition through its states to determine which protocol is used by PMIC 12. If, in S0, it is determined that the SoC power went high, state machine 50 transitions to state 2 (S2). S2 may be referred to as an active high protocol state which indicates that the protocol of PMIC 12 is likely to be an active high protocol since the SoC power was detected after the power request signal went high. In S2, the power on request signal is set to a logic level low. It is then determined whether the SoC power goes low or high in response to the power request signal being set to a logic level low. If the SoC power goes low, state machine 50 determines the configuration of PMIC 12 is protocol A, and state machine 50 transitions to state 9 (S9). Since, upon entering S9 from another state, the protocol of PMIC 12 is determined, S9 may be referred to as the final state.

Figure 14:
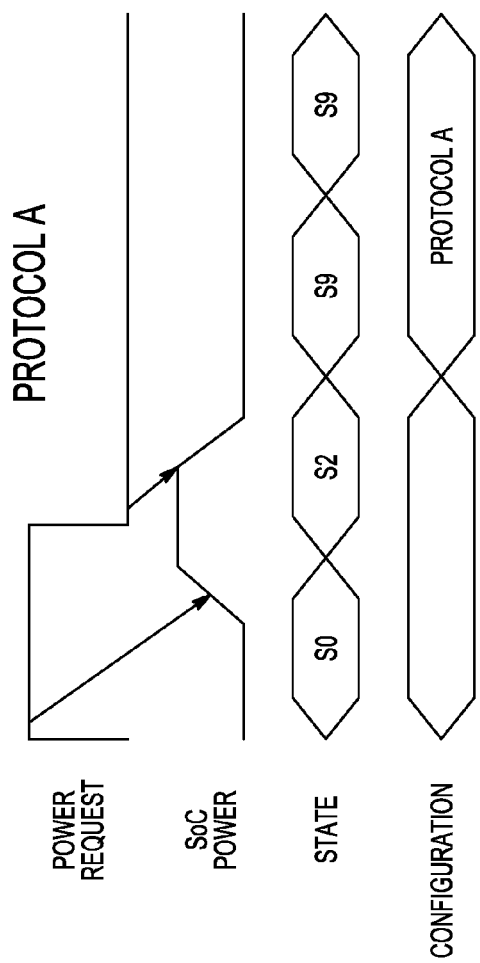
FIG. 14 illustrates, in timing diagram form, a method for detecting the first protocol in accordance with a third example.

Referring to the example of FIG. 14, initially state machine 50 is in state S0 and therefore the power request signal is set to a logic level high. This is therefore provided as a test signal to PMIC 12. In response, PMIC 12 turns on the SoC power such that a ramp-up of SoC power begins, thus transitioning state machine 50 to S2. In S2, the power request signal is set to a logic level low and is provided as a test signal to PMIC 12. In response, PMIC 12 turns off the SoC power. Therefore, when no power is detected from PMIC 12, state machine 50 transitions to S9, and the configuration is determined to be protocol A since PMIC 12 responded appropriately to the power request signal being an active high toggle-mode signal.

Referring back to FIG. 13, if in S2 the SoC power stays high, state machine 50 transitions to state 4 (S4) and the power request signal is set to a logic level high. S4 may be referred to as the active high pulse-mode state which indicates that the protocol is likely a pulse-mode type signal. In S4, it is determined whether the SoC power goes low or high. If the SoC power stays high, state machine 50 may indicate an error in that the protocol cannot be determined and may transition to an error state. If, in S4, the SoC power goes low, state machine 50 determines the configuration of PMIC 12 is protocol D, and state machine 50 transitions to S9.

Figure 17:
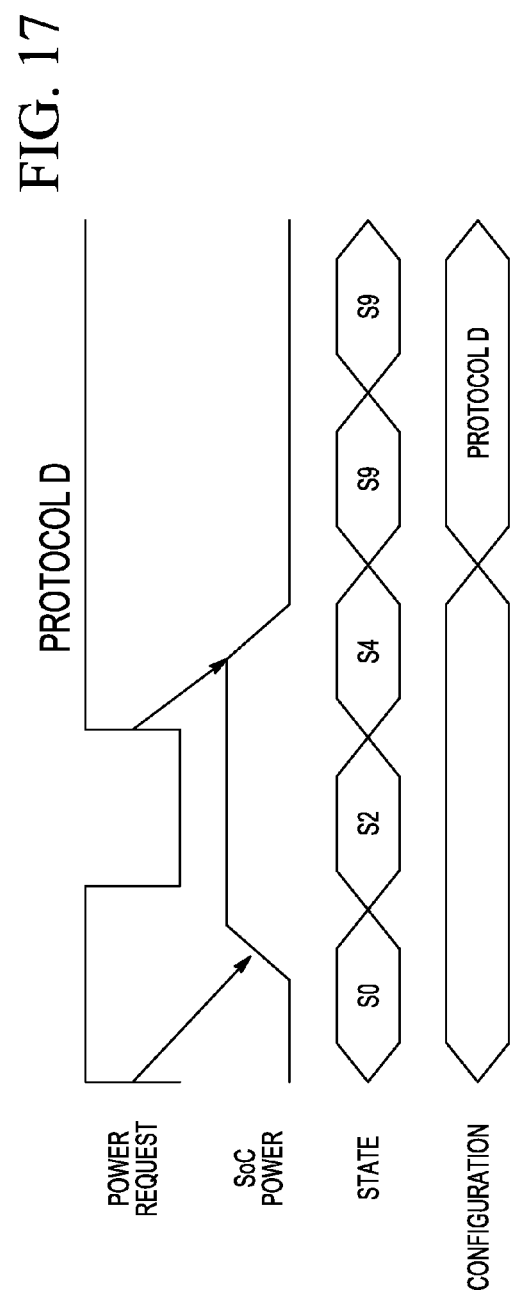
FIG. 17 illustrates, in timing diagram form, a method for detecting the fourth protocol in accordance with a third example.

Referring to the example of FIG. 17, initially state machine 50 is in state S0 and therefore the power request signal is set to a logic level high, thus providing a rising edge of the power request signal. This is provided as a test signal to PMIC 12. In response, PMIC 12 turns on the SoC power such that a ramp-up of SoC power begins, thus transitioning state machine 50 to S2. In S2, the power request signal is to a logic level low. In response, the SoC power remains high, thus transitioning state machine 50 to S4 In S4, the power request signal is set to a logic level high, thus providing a rising edge of the power request signal. In response, the SoC power returns low (indicating no power is detected from PMIC 12), thus state machine 50 transitions to S9, and the configuration is determined to be protocol D since PMIC 12 responded appropriately to the power request signal being an active high pulse-mode signal.

Referring back to FIG. 13, in S0, if it is determined that the SoC power returns low in response to the power request signal being set high in S0, then state machine 50 transitions to state 3 (S3). Upon entering S3, the power request signal is set to a logic level low. S3 may be referred to as the no power detected state which indicates that the protocol is likely to be an active low protocol since the SoC power was not detected after the power request signal went high. In S3, if the SoC power goes high, then state machine transitions to S5. S5 may be referred to as the active low protocol state which detects that the PMIC 12 responded to the lowering of the power request signal. The SoC power has been detected, but it is not yet known if the protocol is a toggle-type or pulse-type protocol. In S5, the power request signal is set to a logic level high. In response to setting the power request signal to a logic level high, if the SoC power goes low, state machine 50 determines the configuration of PMIC 12 is protocol B, and state machine 50 transitions to S9.

Figure 15:
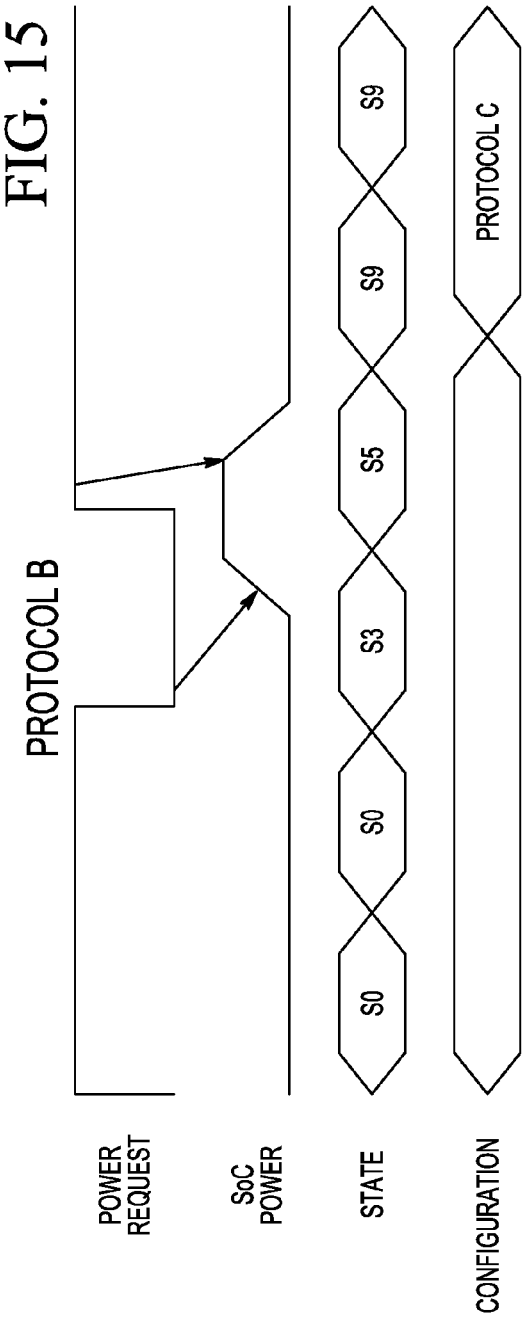
FIG. 15 illustrates, in timing diagram form, a method for detecting the second protocol in accordance with a third example.

Referring to the example of FIG. 15, initially state machine 50 is in state S0 and therefore the power request signal is set to a logic level high. This is therefore provided as a test signal to PMIC 12. In response, the SoC power stays low (in which no power is detected), thus transitioning state machine 50 to S3. Upon transition to S3, the power request signal is set to a logic level low, and in response, PMIC 12 turns on the SoC power such that a ramp-up of SoC power begins. Therefore, power is detected and state machine 50 transitions to S5. In S5, the power request signal is set to a logic level high. The SoC power, in response, goes low. When no power is detected from PMIC 12, state machine 50 transitions to S9, and the configuration is determined to be protocol B since PMIC 12 responded appropriately to the power request signal being an active low toggle-mode signal.

Referring back to FIG. 13, in S5, if it is determined that the SoC power signal stays high, state machine 50 transitions to state 7 (S7), and the power request signal is set low. S7 may be referred to as the active low pulse mode state which indicates that the protocol is probably a pulse-mode. In S7, it is determined whether the SoC power goes low or high. If the SoC power stays high, then an error may be indicated and state machine 50 may transition to an error state. If, in S7, the SoC power goes low, state machine 50 transitions to S9, and the configuration of PMIC 12 is determined to be protocol C.

Figure 16:
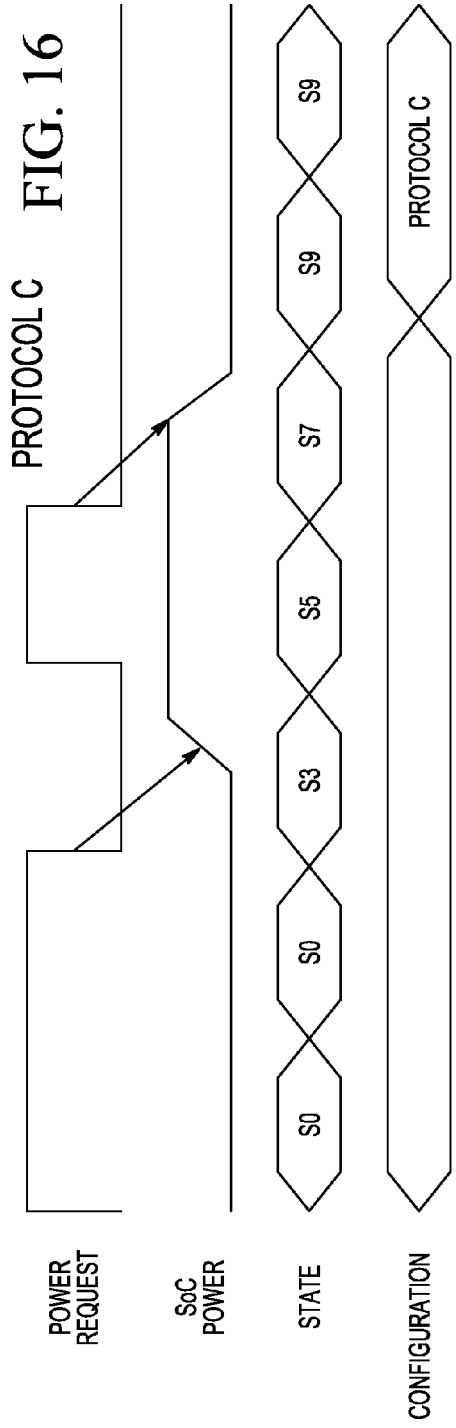
FIG. 16 illustrates, in timing diagram form, a method for detecting the third protocol in accordance with a third example.

Referring to the example of FIG. 16, initially state machine 50 is in state S0 and therefore the power request signal is set to a logic level high. This is therefore provided as a test signal to PMIC 12. In response, the SoC power stays low such that no power is detected, thus transitioning state machine 50 to S3. With the transition to S3, the power request signal is set to low, thus providing a falling edge for the power request signal. In response to the falling edge, PMIC 12 turns on the SoC power such that a ramp-up of SoC power begins, therefore power is detected and state machine 50 transitions to S5. In S5, the power request signal is set to a logic level high, thus providing a rising edge. In response, the SoC power remains high. Therefore, state machine 50 transitions to S7. Upon transitioning to S7, the power request signal is set to low in order to provide a falling edge. In response to the falling edge, PMIC 12 turns off the SoC power. When no power is detected from PMIC 12, state machine 50 transitions to S9, and the configuration is determined to be protocol C since PMIC 12 responded appropriately to the power request signal being an active low pulse-mode signal.

Note that with state machine 50, a timeout power down event is not needed from the PMIC to determine if it is a pulse-mode type.

The above descriptions have been provided with respect to determining a protocol configuration of a PMIC. However, in alternate embodiments, a voltage regulator may be used in place of PMIC 12 which may also have a protocol that is not known a priori. In this case, the same method of state machine 40 or 50 may be used to provide test signals to the voltage regulator while monitoring the output voltage of the voltage regulator to determine the protocol of the voltage regulator. In this manner, the protocol of the voltage regulator can be auto-detected as one of protocol A, B, C, or D, or in the case of an error, a user-assisted mode may be used to set the protocol of the voltage regulator.

Therefore, by now it can be understood how a protocol of a PMIC or voltage regulator can be determined automatically upon application of power by applying test signals to the PMIC or voltage regulator and monitoring the resulting power. In this manner, the type of PMIC or voltage regulator that is to be used in a system with an SoC need not be known at design time. Furthermore, there has been provided a method in which, if the protocol cannot be automatically detected, the appropriate protocol can be set with user input.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans will appreciate that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, IC 16 may be located on a separate integrated circuit as PMIC 12.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, state machine 40 may or may not allow for user-assisted states. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a semiconductor device includes: a processing system including a section of power domain circuitry and a section of coin cell power domain circuitry, wherein the coin cell power domain circuitry is configured to: when power is initially provided to the coin cell power domain circuitry, using power provided by a power management circuit as feedback to determine that the power management circuit provides the power in response to a power request signal being a toggle signal, and determine that the power management circuit provides the power in response to the power request signal being a pulse signal. Item 2 includes the device of item 1 wherein to determine that the power management circuit provides the power in response to the toggle signal, the coin cell power domain circuitry is configured to: from a reset state, detect the power goes high to enter a second state; from the second state, detect that the power stays high and configure a protocol to use the toggle signal, wherein a single cycle of the toggle signal transitions from low to high to enter a final state. Item 3 includes the device of item 1, wherein to determine that the power management circuit provides the power in response to the toggle signal, the coin cell power domain circuitry is configured to: from a reset state, detect the power is low and set the power request signal low to enter a third state; from the third state, detect when the power goes high to enter a fifth state; from the fifth state, detect that the power stays high and configure a protocol to use the toggle signal, wherein a single cycle of the toggle signal transitions from high to low to enter a final state. Item 4 includes the device of item 1, wherein to determine that the power management circuit provides the power in response to the pulse signal, the coin cell power domain circuitry is configured to: from a reset state, detect the power is low and set the power request signal low to enter a third state; from the third state, detect when the power goes high to enter a fifth state; from the fifth state, detect that the power goes low to enter a seventh state; from the seventh state, set the power request signal high to enter an eighth state; from the eighth state, detect when the power stays high and configure a protocol to use the pulse signal, wherein a single cycle of the pulse signal transitions from high to low and back to high to enter a final state. Item 5 includes the device of item 4, wherein the coin cell power domain circuitry is further configured to: from the seventh state, detect when the power stays low to enter a tenth state; from the eighth state, detect when the power goes low and set the power request signal low to enter the tenth state; from the tenth state, when an initial number of attempts is not exhausted and a specified period of time has expired, return to the reset state. Item 6 includes the device of item 1 wherein to determine that the power management circuit provides the power in response to the pulse signal, the coin cell power domain circuitry is configured to: from a reset state, detect the power goes high to enter a second state; from the second state, detect that the power goes low and set the power request signal low and then high to enter a fourth state; from the fourth state, detect when the power goes high and set the power request signal low to enter a sixth state; from the sixth state, detect that the power stays high and configure a protocol to use the pulse signal, wherein a single cycle of the pulse signal transitions from low to high and back to low to enter a final state. Item 7 includes the device of item 6 wherein the coin cell power domain circuitry is further configured to: from the fourth state, detect when the power stays low and the power request signal is low to enter a tenth state; from the sixth state, detect when the power goes low to enter the tenth state; from the tenth state, when an initial number of attempts is not exhausted and a specified period of time has expired, return to the reset state. Item 8 includes the device of item 1 wherein the coin cell power domain circuitry is further configured to: enter a twelfth state when a user presses a power button and set the power request signal high; from the twelfth state, detect when the power is high and configure a protocol to use the trigger signal, wherein a single cycle of the trigger signal transitions from low to high to enter a final state. Item 9 includes the device of item 1 wherein the coin cell power domain circuitry is further configured to: enter a twelfth state when a user presses a power button and set the power request signal high; from the twelfth state, detect when the user presses the power button longer than a specified time to enter a fourteenth state; from the fourteenth state, detect when power is high and configure a protocol to use the pulse signal, wherein a single cycle of the pulse signal transitions from low to high and back to low to enter a final state. Item 10 includes the device of item 1 wherein the coin cell power domain circuitry is further configured to: enter a twelfth state when a user presses a power button and set the power request signal high; from the twelfth state, detect when the user presses the power button longer than a specified time to enter a fourteenth state; from the fourteenth state, detect when the power is low and set the power request signal low to enter a fifteenth state; from the fifteenth state, detect the power is high and configure a protocol to use the trigger signal, wherein a single cycle of the trigger signal transitions from high to low to enter a final state. Item 11 includes the device of item 1 wherein the coin cell power domain circuitry is further configured to: enter a twelfth state when a user presses a power button and set the power request signal high; from the twelfth state, detect when the user presses the power button at least a minimum specified time and set the power request signal to low to enter a thirteenth state; from the thirteenth state, detect when power is high and configure a protocol to use the pulse signal, wherein a single cycle of the pulse signal transitions from high to low and back to high to enter a final state.

Item 12 includes a semiconductor device including: coin cell power domain circuitry configured to: receive power provided by a power management circuit; use the power as feedback to determine whether the power management circuit uses a toggle signal or a pulse signal to supply the power; provide the toggle signal at an output pad when the power management circuit uses the toggle signal; and provide the pulse signal at the output pad when the power management circuit uses the pulse signal. Item 13 includes the semiconductor device of item 12 wherein: the coin cell power domain circuitry is further configured to provide a power gate signal to power gated circuitry coupled to the coin cell power domain circuitry, wherein the power gated signal is used to remove power from the power gated circuitry while determining whether the power management circuit uses a toggle signal or a pulse signal. Item 14 includes the semiconductor device of item 12 wherein: the coin cell power domain circuitry is further configured to provide the toggle signal or the pulse signal for subsequent power request signals to the power management circuit. Item 15 includes the semiconductor device of item 12 wherein to determine that the power management circuit uses the toggle signal, the coin cell power domain circuitry is configured to: detect the power transitions from a first state to a second state; from the second state, detect that the power returns to the first state. Item 16 includes the semiconductor device of item 12 wherein to determine that the power management circuit uses the pulse signal, the coin cell power domain circuitry is configured to: from a reset state, detect power is low and a power request signal is low to enter a first state; from the first state, detect the power request signal goes high while the power is low to enter a third state; from the third state, detect when the power goes high to enter a fifth state; from the fifth state, detect that the power request signal goes high to enter a seventh state; from the seventh state, detect the power request signal goes low to enter a ninth state; from the ninth state, configure a protocol to use the pulse signal, wherein a single cycle of the pulse signal transitions from low to high and back to low to enter the ninth state. Item 17 includes the semiconductor device of item 12 wherein to determine that the power management circuit uses the pulse signal, the coin cell power domain circuitry is configured to: from a reset state, detect when a power request signal goes high to enter a first state; from the first state, detect the power goes high to enter a second state; from the second state, detect that the power stays high and the power request signal goes low to enter a fourth state; from the fourth state, detect when the power goes low and the power request signal goes high to enter a ninth state; from the ninth state, configure a protocol to use the pulse signal, wherein a single cycle of the pulse signal transitions from high to low and back to high to enter the ninth state. Item 18 includes the semiconductor device of item 12 wherein the coin cell power domain circuitry is further configured to: enter a twelfth state when a user presses a power button and set the power request signal high; from the twelfth state, detect when the power is high and configure a protocol to use the trigger signal, wherein a single cycle of the trigger signal transitions from low to high to enter a final state; from the twelfth state, detect when the user presses the power button longer than a specified time to enter a fourteenth state, and from the fourteenth state, detect when power is high and configure a protocol to use the pulse signal, wherein a single cycle of the pulse signal transitions from low to high and back to low to enter a final state; detect when the power is low and set the power request signal low to enter a fifteenth state, and from the fifteenth state, detect the power is high and configure a protocol to use the trigger signal, wherein a single cycle of the trigger signal transitions from high to low to enter a final state; from the twelfth state, detect when the user presses the power button at least a minimum specified time and set the power request signal to low to enter a thirteenth state; from the thirteenth state, detect when power is high and configure a protocol to use the pulse signal, wherein a single cycle of the pulse signal transitions from high to low and back to high to enter a final state.

Item 19 includes a method including: receiving, in coin cell power domain circuitry, power provided by a power management circuit; testing, in the coin cell power domain circuitry, different combinations of the power and a power request signal to determine a signaling protocol used by the power management circuit to supply the power; and providing the power request signal based on the signaling protocol at an output pad coupled to the coin cell power domain circuitry. Item 20 includes the method of item 19 and further includes configuring pull resistors coupled to the output pad to a supply voltage or ground based on whether the signaling protocol is active high or active low.

What is claimed is:

1. A semiconductor device comprising:
   a processing system including a section of power domain circuitry and a section of coin cell power domain circuitry, wherein the coin cell power domain circuitry is configured to:
      when power is initially provided to the coin cell power domain circuitry, using power provided by a power management circuit as feedback to
         determine that the power management circuit provides the power in response to a power request signal being a toggle signal, and
         determine that the power management circuit provides the power in response to the power request signal being a pulse signal.

2. The device of claim 1 wherein to determine that the power management circuit provides the power in response to the toggle signal, the coin cell power domain circuitry is configured to:
   from a reset state,
      detect the power goes high to enter a second state;
      from the second state, detect that the power stays high and configure a protocol to use the toggle signal, wherein a single cycle of the toggle signal transitions from low to high to enter a final state.

3. The device of claim 1, wherein to determine that the power management circuit provides the power in response to the toggle signal, the coin cell power domain circuitry is configured to:
   from a reset state,
      detect the power is low and set the power request signal low to enter a third state;
      from the third state, detect when the power goes high to enter a fifth state;
      from the fifth state, detect that the power stays high and configure a protocol to use the toggle signal, wherein a single cycle of the toggle signal transitions from high to low to enter a final state.

4. The device of claim 1, wherein to determine that the power management circuit provides the power in response to the pulse signal, the coin cell power domain circuitry is configured to:
from a reset state,
detect the power is low and set the power request signal low to enter a third state;
from the third state, detect when the power goes high to enter a fifth state;
from the fifth state, detect that the power goes low to enter a seventh state;
from the seventh state, set the power request signal high to enter an eighth state;
from the eighth state, detect when the power stays high and configure a protocol to use the pulse signal, wherein a single cycle of the pulse signal transitions from high to low and back to high to enter a final state.

5. The device of claim 4 wherein the coin cell power domain circuitry is further configured to:
from the seventh state, detect when the power stays low to enter a tenth state;
from the eighth state, detect when the power goes low and set the power request signal low to enter the tenth state;
from the tenth state, when an initial number of attempts is not exhausted and a specified period of time has expired, return to the reset state.

6. The device of claim 1 wherein to determine that the power management circuit provides the power in response to the pulse signal, the coin cell power domain circuitry is configured to:
from a reset state,
detect the power goes high to enter a second state;
from the second state, detect that the power goes low and set the power request signal low and then high to enter a fourth state;
from the fourth state, detect when the power goes high and set the power request signal low to enter a sixth state;
from the sixth state, detect that the power stays high and configure a protocol to use the pulse signal, wherein a single cycle of the pulse signal transitions from low to high and back to low to enter a final state.

7. The device of claim 6 wherein the coin cell power domain circuitry is further configured to:
from the fourth state, detect when the power stays low and the power request signal is low to enter a tenth state;
from the sixth state, detect when the power goes low to enter the tenth state;
from the tenth state, when an initial number of attempts is not exhausted and a specified period of time has expired, return to the reset state.

8. The device of claim 1 wherein the coin cell power domain circuitry is further configured to:
enter a twelfth state when a user presses a power button and set the power request signal high;
from the twelfth state, detect when the power is high and configure a protocol to use the trigger signal, wherein a single cycle of the trigger signal transitions from low to high to enter a final state.

9. The device of claim 1 wherein the coin cell power domain circuitry is further configured to:
enter a twelfth state when a user presses a power button and set the power request signal high;
from the twelfth state, detect when the user presses the power button longer than a specified time to enter a fourteenth state;
from the fourteenth state, detect when power is high and configure a protocol to use the pulse signal, wherein a single cycle of the pulse signal transitions from low to high and back to low to enter a final state.

10. The device of claim 1 wherein the coin cell power domain circuitry is further configured to:
enter a twelfth state when a user presses a power button and set the power request signal high;
from the twelfth state, detect when the user presses the power button longer than a specified time to enter a fourteenth state;
from the fourteenth state, detect when the power is low and set the power request signal low to enter a fifteenth state;
from the fifteenth state, detect the power is high and configure a protocol to use the trigger signal, wherein a single cycle of the trigger signal transitions from high to low to enter a final state.

11. The device of claim 1 wherein the coin cell power domain circuitry is further configured to:
enter a twelfth state when a user presses a power button and set the power request signal high;
from the twelfth state, detect when the user presses the power button at least a minimum specified time and set the power request signal to low to enter a thirteenth state;
from the thirteenth state, detect when power is high and configure a protocol to use the pulse signal, wherein a single cycle of the pulse signal transitions from high to low and back to high to enter a final state.

12. A semiconductor device comprising:
coin cell power domain circuitry configured to:
receive power provided by a power management circuit;
use the power as feedback to determine whether the power management circuit uses a toggle signal or a pulse signal to supply the power;
provide the toggle signal at an output pad when the power management circuit uses the toggle signal; and
provide the pulse signal at the output pad when the power management circuit uses the pulse signal.

13. The semiconductor device of claim 12 wherein:
the coin cell power domain circuitry is further configured to provide a power gate signal to power gated circuitry coupled to the coin cell power domain circuitry, wherein the power gated signal is used to remove power from the power gated circuitry while determining whether the power management circuit uses a toggle signal or a pulse signal.

14. The semiconductor device of claim 12 wherein:
the coin cell power domain circuitry is further configured to provide the toggle signal or the pulse signal for subsequent power request signals to the power management circuit.

15. The device of claim 12 wherein to determine that the power management circuit uses the toggle signal, the coin cell power domain circuitry is configured to:
detect the power transitions from a first state to a second state;
from the second state, detect that the power returns to the first state.

16. The device of claim 12, wherein to determine that the power management circuit uses the pulse signal, the coin cell power domain circuitry is configured to:
from a reset state,
  detect power is low and a power request signal is low to enter a first state;
  from the first state, detect the power request signal goes high while the power is low to enter a third state;
  from the third state, detect when the power goes high to enter a fifth state;
  from the fifth state, detect that the power request signal goes high to enter a seventh state;
  from the seventh state, detect the power request signal goes low to enter a ninth state;
  from the ninth state, configure a protocol to use the pulse signal, wherein a single cycle of the pulse signal transitions from low to high and back to low to enter the ninth state.

17. The device of claim 12, wherein to determine that the power management circuit uses the pulse signal, the coin cell power domain circuitry is configured to:
from a reset state,
  detect when a power request signal goes high to enter a first state;
  from the first state, detect the power goes high to enter a second state;
  from the second state, detect that the power stays high and the power request signal goes low to enter a fourth state;
  from the fourth state, detect when the power goes low and the power request signal goes high to enter a ninth state;
  from the ninth state, configure a protocol to use the pulse signal, wherein a single cycle of the pulse signal transitions from high to low and back to high to enter the ninth state.

18. The device of claim 12 wherein the coin cell power domain circuitry is further configured to:
  enter a twelfth state when a user presses a power button and set the power request signal high;
  from the twelfth state, detect when the power is high and configure a protocol to use the trigger signal, wherein a single cycle of the trigger signal transitions from low to high to enter a final state;
  from the twelfth state, detect when the user presses the power button longer than a specified time to enter a fourteenth state, and from the fourteenth state,
    detect when power is high and configure a protocol to use the pulse signal,
      wherein a single cycle of the pulse signal transitions from low to high and back to low to enter a final state;
    detect when the power is low and set the power request signal low to enter a fifteenth state, and from the fifteenth state, detect the power is high and configure a protocol to use the trigger signal, wherein a single cycle of the trigger signal transitions from high to low to enter a final state;
  from the twelfth state, detect when the user presses the power button at least a minimum specified time and set the power request signal to low to enter a thirteenth state;
  from the thirteenth state, detect when power is high and configure a protocol to use the pulse signal, wherein a single cycle of the pulse signal transitions from high to low and back to high to enter a final state.

19. A method comprising:
receiving, in coin cell power domain circuitry, power provided by a power management circuit;
testing, in the coin cell power domain circuitry, different combinations of the power and a power request signal to determine a signaling protocol used by the power management circuit to supply the power; and
providing the power request signal based on the signaling protocol at an output pad coupled to the coin cell power domain circuitry.

20. The method of claim 19 further comprising:
configuring pull resistors coupled to the output pad to a supply voltage or ground based on whether the signaling protocol is active high or active low.

* * * * *